United States Patent
Lupke et al.

Patent Number: 5,824,351
Date of Patent: Oct. 20, 1998

[54] MOLDING APPARATUS WITH NON-REFLECTIVE MOLD TUNNELS

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 677,368

[22] Filed: Jul. 5, 1996

[51] Int. Cl.[6] .............................. B29C 33/06; B29C 53/30
[52] U.S. Cl. ................. 425/233; 264/209.4; 264/508; 425/326.1; 425/336; 425/384; 425/392; 425/396
[58] Field of Search .............................. 425/233, 326.1, 425/336, 384, 392, 396, DIG. 13; 264/508, 209.4; 249/134, 135

[56] References Cited

U.S. PATENT DOCUMENTS

| | | | |
|---|---|---|---|
| 4,298,324 | 11/1981 | Soulier | 425/DIG. 13 |
| 4,478,779 | 10/1984 | Russell et al. | 249/135 |
| 4,721,594 | 1/1988 | Jarvenkyla | 425/396 |
| 4,873,048 | 10/1989 | Jarvenkyla | 425/326.1 |
| 4,900,503 | 2/1990 | Hegler et al. | 425/396 |
| 5,002,478 | 3/1991 | Lupke | 425/396 |
| 5,059,109 | 10/1991 | Dickhut et al. | 425/233 |
| 5,573,787 | 11/1996 | Lupke et al. | 425/326.1 |

FOREIGN PATENT DOCUMENTS 4023887  1/1992  Germany .

*Primary Examiner*—Jay H. Woo
*Assistant Examiner*—Joseph Leyson

[57] ABSTRACT

A plastic part forming apparatus includes a mold tunnel into which molten plastic is fed to form the plastic part. The mold tunnel is made from thermally conductive material and has a part shaping interior face which is non-reflective such that the interior surface has high capacity to absorb heat energy from the plastic fed into the mold tunnel. The thermally conductive material then dissipates the heat energy from the mold tunnel.

2 Claims, 2 Drawing Sheets

MOLDING APPARATUS WITH NON-REFLECTIVE MOLD TUNNELS

FIELD OF THE INVENTION

The present invention relates to a plastic part forming apparatus having a mold tunnel designed to absorb radiant heat energy and then dissipate that heat energy from the mold tunnel.

BACKGROUND OF THE INVENTION

In a conventional plastic part forming apparatus such as a pipe mold, plastic is fed in a molten state from an extruder into a mold tunnel. The mold tunnel has an interior surface which is specifically made with a smooth, shiny or mirrored like finish which allows the part to easily release from the mold surface.

The purpose of the mold tunnel is to produce a specific shape of the plastic while allowing the plastic to cool and hold that shape. As long as the plastic remains in direct contact with the mold surface, there is a natural heat transfer from the plastic into the mold tunnel. However, as the plastic cools, it tends to shrink and pulls away from the mold surface. At this point, any further cooling of the plastic must be through radiant heat transfer into the mold tunnel. However, the conventional smooth shiny interior mold surface is very inefficient in this regard and much of the heat energy radiating from the plastic reflects off the shiny interior surface of the mold tunnel back into the plastic. This substantially increases cooling time and reduces productivity of the apparatus.

SUMMARY OF THE INVENTION

The present invention provides a plastic part forming apparatus specifically designed to alleviate the draw backs noted above with prior art apparatus. More particularly, the plastic part forming apparatus of the present invention includes a mold tunnel into which molten plastic is fed to form the part. The mold tunnel is made from a thermally conductive material and has a part shaping interior surface which is non-reflective such that the interior surface has high capacity to absorb heat energy from the plastic fed into the mold tunnel.

With this arrangement, there is still an efficient cooling of the plastic by radiant heat transfer even after the plastic has pulled away through shrinkage from the interior surface of the mold tunnel. The heat energy transferred to the mold tunnel is then dissipated from the mold tunnel because of its thermally conductive construction.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
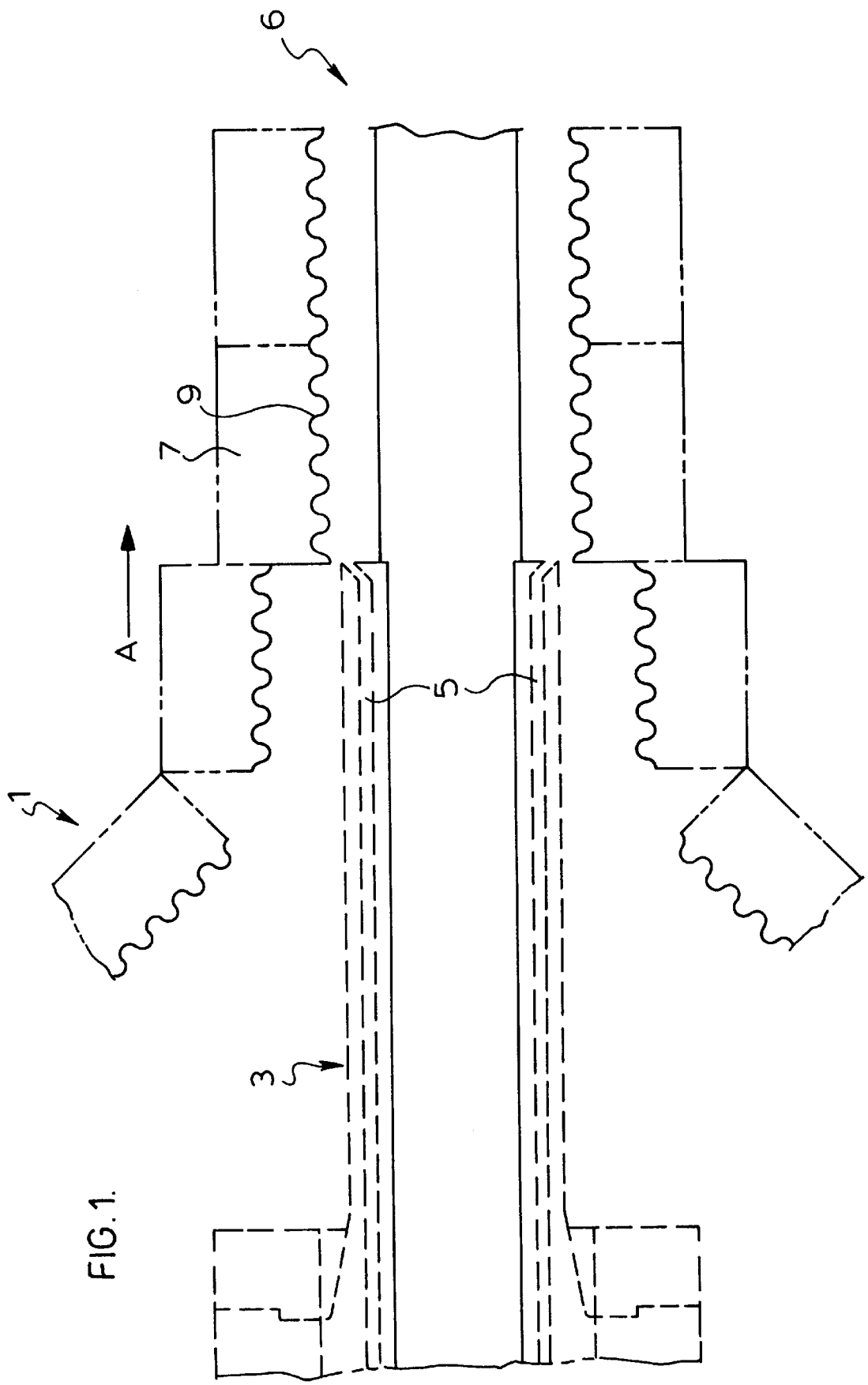
FIG. 1 shows a plastic part forming apparatus and in particular a pipe mold made in accordance with a preferred embodiment of the present invention.

FIG. 1 shows a pipe molding apparatus generally indicated at 1. This apparatus includes a plastic extruder 3 having a plastic flow path 5 which feeds molten plastic to a mold tunnel generally indicated at 6. In this particular case, the mold tunnel is formed by a plurality of mold block sections 7 which cooperate with one another as they move downstream of the apparatus in the direction of arrow A to form a moving mold tunnel.

Each of the mold block sections has a profiled interior surface 9 onto which the plastic flows from the extruder. The profile of surface 9 determine the exterior surface shaping of the pipe.

Figure 2:
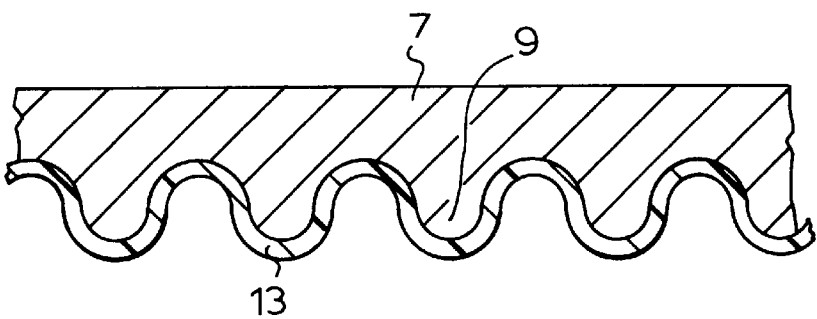
FIG. 2 is an enlarged sectional view through an upstream portion of the mold tunnel of the apparatus of FIG. 1.

FIG. 2 shows a layer of plastic 13 after it is extruded and forced onto the interior surface 9 of mold block section 7. In FIG. 2, the plastic is in direct contact with the mold block surface as is the case at the upstream end of the mold tunnel.

Figure 3:
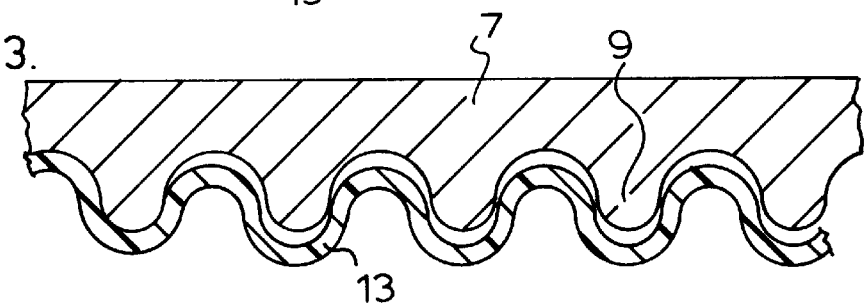
FIG. 3 is a further view of the interior surface of the mold tunnel but in a more downstream position than that shown in FIG. 2.

In the FIG. 2 condition with direct contact there is conduction of the heat energy from the plastic into the mold block section. However, as the plastic moves further downstream into the mold tunnel it cools producing shrinkage of the plastic and causing the plastic to pull away from the surface of the mold block section as shown in FIG. 3 of the drawings. In this condition, further cooling of the plastic must be achieved by the heat energy radiating from the plastic into the mold block.

Figure 4:
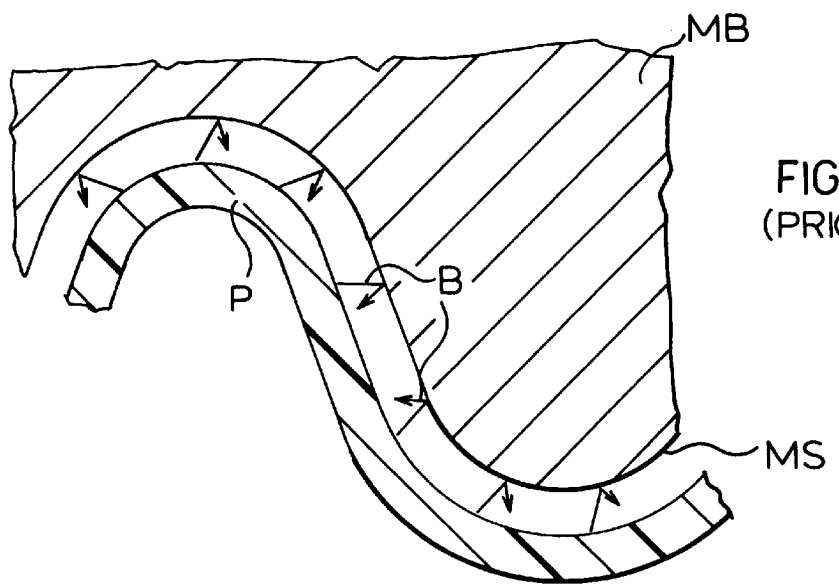
FIG. 4 shows shrinkage of the plastic material from the interior mold surface and the effects of that shrinkage as found in the prior art.

FIG. 4 shows a layer of plastic P in a mold tunnel when it is away from the mold surface MS of a mold block MB in accordance with prior art construction. This mold surface of a prior mold tunnel as described above, is highly polished and very inefficient in absorbing radiant heat energy. Arrows B show that much of the heat energy radiated from the plastic is reflected off the mold surface MS back into the plastic.

Figure 5:
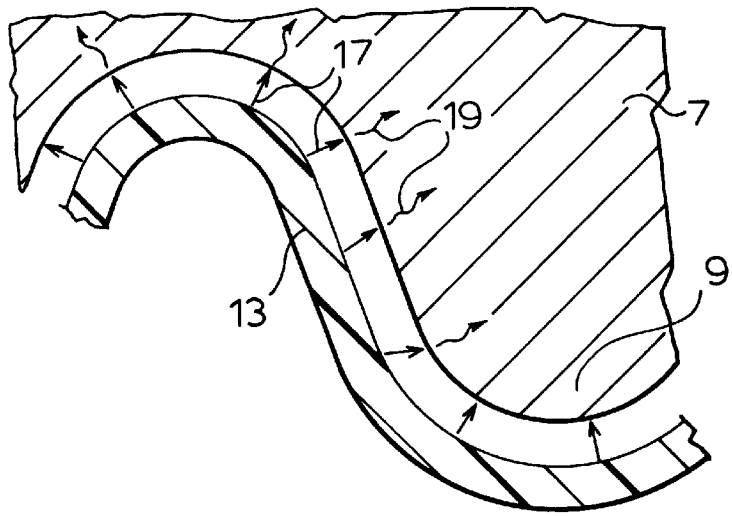
FIG. 5 shows the shrinkage of the plastic material from the interior mold surface and the effects of that shrinkage in accordance with the present invention.

FIG. 5 of the drawings shows that the mold block surface 9 of mold block section 7 in accordance with the present invention has a substantially non-reflective finish 10. Accordingly, heat energy radiating from the plastic 13 is absorbed by this non-reflective finish as indicated by arrows 17 causing absorption of the heat energy into the mold block section.

The mold block section itself is made from a thermally conductive material such as steel or aluminum so that the absorbed heat energy is then dissipated directly through the mold block section as indicated by arrows 19.

To further enhance heat dissipation, the entirety of the mold block section is darkened which is particularly useful when the mold tunnel is air as opposed to water cooled.

There are numerous ways of providing the non-reflective finish or surface treatment on the mold block sections as for example by roughening and/or dulling the mold block surface. This substantially eliminates reflection of the heat energy back into the plastic.

It is particularly efficient to darken or blacken the interior of the mold surface which maximizes its ability to pick up heat energy radiating from the plastic.

It may be desirable in accordance with the present invention to additionally provide some sort of a release agent along the interior surface of the mold tunnel to ease the releasing of the plastic from the mold surface.

Again, after the plastic has released, it will, in accordance with the present invention continue to lose heat energy to the mold block sections by means of radiant heat transfer to the non-reflective interior surface of the mold tunnel.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A pipe molding apparatus comprising an extruder which feeds molten plastic to a moving mold tunnel comprised of a plurality of mold blocks each of which is formed by mold block sections which close and move with one another along said mold tunnel to shape the pipe, each mold block section having an interior surface onto which the plastic flows from the extruder to shape the pipe in an upstream region of the mold tunnel, the interior surface of each mold block section having a non-reflective surface treatment such that the interior surface of each mold block sections absorbs heat energy radiated from the pipe after the pipe cools and shrinks away from the interior surface of each mold block section in a downstream region of the mold tunnel, and each mold block section being made from a heat conductive material which conducts the heat energy absorbed through the interior surface of each mold block section through each mold block section away from the pipe.

2. A pipe molding apparatus as claimed in claim 1, wherein said surface treatment comprises a roughening of the interior surface of each mold block section and wherein the interior surface of each mold block section is provided with a release agent which eases releasing of the pipe from the interior surface of each mold block section as the pipe cools and shrinks.

* * * * *